United States Patent
Fenner et al.

[15] 3,688,579
[45] Sept. 5, 1972

[54] XERIC ELEMENT AND METHOD OF PREPARING THE SAME

[72] Inventors: Ralph L. Fenner, 86 Bayvista Drive, Mill Valley, Calif. 94941; Mary F. Martin, 2762-79th Ave., Oakland, Calif. 94605

[22] Filed: June 8, 1970

[21] Appl. No.: 44,626

Related U.S. Application Data

[63] Continuation-in-part of Ser. No. 834,087, June 17, 1969, abandoned.

[52] U.S. Cl..................................................73/337
[51] Int. Cl............................................G01n 19/10
[58] Field of Search..........73/337, 337.5, 336.5, 335, 73/29

[56] References Cited

UNITED STATES PATENTS

| | | | |
|---|---|---|---|
| 3,135,117 | 6/1964 | Fenner | 73/337 |
| 3,198,011 | 8/1965 | Fenner | 73/337.5 |
| 2,699,062 | 1/1955 | Tomaschek | 73/337.5 |

OTHER PUBLICATIONS

" Gray's Manual of Botany" rewritten by Merrit Lyndon Ferwald; 8th edition copyright 1950; pages 946 and 947

" Just Weeds" by Edwin Rollin Spencer; page 141; copyright 1940 and 1957

*Primary Examiner*—Louis R. Prince
*Assistant Examiner*—Denis E. Corr
*Attorney*—Robyn Wilcox

[57] ABSTRACT

The invention relates to a xeric element comprising the spine of the throwing arm of the seed pods of plants of the genus Geranium, and the method of preparing it for use in instruments which measure or respond to relative humidity or dryness. The plants of this genus literally "throw" their seeds and the spines of the seed pod are characterized by having a substantially uniplanar movement, a rapid response to changes in relative humidity, inherent strength sufficient to avoid breakage when bridled, and its warp movement is reversible on a substantially identical hysteresis curve on both adsorption and desorption. Preferably, the seed pods are gathered after the seeds are thrown, the throwing arms removed from the balance of the pod, the arms retted by soaking in warm water, and then the woody fiber coating and beards on the ribs of the arms are removed. Also preferably, such ribs are attached at their ends only to a cradle formed of a thin strip of beryllium copper.

14 Claims, 8 Drawing Figures

INVENTOR.
RALPH L. FENNER
BY
Robyn Wilcox
ATTORNEY

INVENTOR.
RALPH L. FENNER
BY Robyn Hilcox
ATTORNEY

XERIC ELEMENT AND METHOD OF PREPARING THE SAME

This application is a continuation-in-part of our pending application of the same title, Ser. No. 834,087, filed June 17, 1969, now abandoned.

BACKGROUND OF THE INVENTION

It has long been known that the seeds of the genus Erodium, one branch of the Geranium family, have pronounced xeric qualities and hence the seeds of that genus have been used to operate weather indicators, and more recently have been used as the operative elements of xeric instruments. In contrast to the prior art, which used the corkscrew-like tail of the seed for a moisture-sensitive element, this invention relates to the seed-throwing extension, or arm, of the seed pod of the plants of the genus Geranium, which have better xeric qualities than the seeds heretofore used. The seed-throwing arms of these plants have superior xeric qualities in that they are much more rapid in the speed of their response to changes in relative humidity of the environment; the hysteresis curves (curve of movement in adsorption or desorption) is substantially the same, as compared to considerable differences in the older art; and the elements lie in the form of a uni-planar spiral rather than the helix form of the seeds of Erodium plants. When dry, these "throwing arms" of the pods of plants in the genus Geranium assume a shape such as that shown in FIG. 1 and form a uni-planar spiral of between 450° and 540°, and become straight (but not limp) when saturated. The "throwing arm" of the seed pod can be used for some purposes in its natural condition, but in its natural state is not as accurate as when the spine, or rib, of the arm is cleaned of the other material composing the arm, as the spine has a much greater accuracy and much longer life, and is less readily affected by heat and pressure than the original arm.

OBJECTS

It is an object of the present invention to provide an improved xeric element.

It is another object of the invention to provide a xeric element which has a warp force in a single plane, i.e., forms a spiral, in contrast to the helical members heretofore known.

Another important object of the invention is to provide a fibrous xeric element which has a warp force varying inversely with humidity without longitudinal expansion.

It is still another object of the invention of to provide a xeric element which does not require the complicated modifying devices of the prior art when the element is used in an instrument.

A further object of the invention is to provide a xeric element which does not acquire a "set" from prolonged exposure at moisture extremes often found in measuring and scientific devices.

It is still a further object of the invention to provide a xeric element which has minimum hysteresis on both adsorption and desorption cycles, has long life, a rapid speed of response and is small in size.

It is a further object of this invention to provide a xeric element of improved viscoelastic qualities.

It is another object of the invention to provide a xeric element with better thermal characteristics than heretofore known, so that warping is due to moisture only and not a combination of temperature and moisture.

It is still a further object of the invention to provide a xeric element which is readily incorporated in instruments for various purposes, such as measuring relative humidity, controlling relative humidity, and the like.

Another important object of this invention is to provide a partially bridled xeric element in which the xeric element is attached to a thin and resilient piece of metal at the ends only, whereby the warp force of the xeric element will not be adversely affected by thermal expansion or contractions of the metal.

These and further objects of the invention will be apparent from the following detailed description of the xeric element, taken in conjunction with the accompanying drawings in which.

Figure 1:
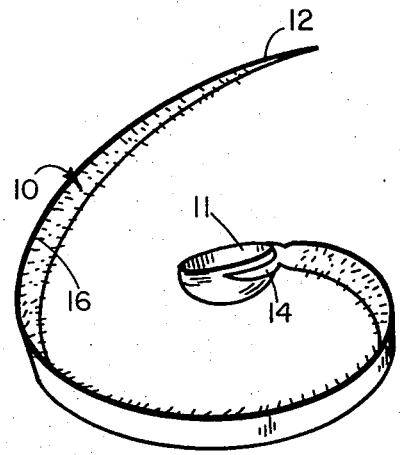
FIG. 1 is a greatly enlarged plan view of the seed-throwing arm of the extension of the seed pod or husk of *Geranium dissectum*.

The invention relates to a xeric element and the method of preparing it for use in instruments which measure or respond to relative humidity, or dryness. The word "xeric" is used in its scientific and technical sense as indicating a condition of dryness, and is, therefore, commonly used to refer to devices or elements which are responsive to, or measure, relative humidity.

The device of the present invention is designed to provide a very sensitive and fast acting element suitable for use in measuring the relative humidity of the environment in which it is located. Such a device can be used simply to measure the relative humidity of the environment, or it can be used as the sensing and actuating element of a xeritron (a device for modifying resistance in an electric circuit and thus valuable in telemetering a registration of relative humidity, or operating a signal in the event the relative humidity goes beyond some predetermined point), or other devices in which a measurement of relative humidity is important.

Heretofore it has been impossible to simply, and at the same time, accurately, measure or control moisture, or more specifically, the relative humidity of a particular environment. Even the use of the seed of the genus Erodium, which is described in Fenner's patents, U.S. Pat. Nos. 3,135,117 and 3,198,011, required very complicated devices as shown in the latter patent. In the past, accurate methods of measurement required sensors combined with other instruments, such as the dry and wet bulb thermometers used by meteorologists in their determination of humidity in the atmosphere, and the readings thus secured were computed by the use of tables, complicated computations, and the like. In contrast, the present invention utilizes the seed pods (not the seeds) of a genus quite unlike the common garden Geranium (which is one of the genus Pelargonium) or the genus Erodium commonly used in the prior art. Specifically, the present invention utilizes the spine of the throwing arm of the seed pods of the genus Geranium (which does not include the plants commonly called "geraniums", for they are members of the genus Pelargonium, whose seeds and seed pods are similar to those of the genus Erodium), and particularly the species *Geranium dissectum*, *Geranium Richardsonii*, *Geranium attenuilobum*, *Geranium maculatum*, and *Geranium eriostemon*. These seed-throwing arms of the seed pod, especially when prepared as suggested below and as will be more fully described hereafter, provide a simple and accurate measurement of relative humidity which is accurate both in the adsorption and desorption cycles, which can readily be read, and which is completely reversible in its movement. The particular species mentioned above, and others of the genus, have been tested and all are found to have sufficient strength, satisfactory life, reversible movement as the humidity of the environment changes, rapid response to change of humidity, and good viscoelastic and thermal characteristics. However, it can be mentioned that to the present time the pods of the Geranium dissectum have been most often used as that plant is most readily available in the San Francisco Bay area. However, the seed pods of the other species mentioned are preferred as they form the uni-planar spiral shown in the figures, and the arms are much longer and stronger. Other plants of the genus have been found to have the same characteristics, but in varying degrees. These elements respond substantially only to water and can be used in gas or liquid systems since they do not respond appreciably to gas or larger molecules of the nature of alcohol or acetone, oils, etc. These elements likewise do not respond to changes in temperature or to changes in gas pressure, except as such conditions influence water vapor pressure and have been found suitable for use in systems up to 3,000 pounds per square inch.

It has long been known that the seeds of the genus Erodium, one branch of the Geranium family, have pronounced xeric qualities and hence the seeds of that genus have been used to operate weather indicators, and more recently have been used as the operative elements of xeric instruments. For example, see Fenner's prior patents above mentioned, and the references there cited. Seeds of the genus Pelargonium (which, incidentally, includes the plants commonly called "Geraniums"), have the same quality to a limited extent. This invention relates to the seed-throwing extension, or arm, of the seed pod of the plants of the genus Geranium which have better xeric qualities than the seeds heretofore used. The plants of the genus Geranium literally throw their seeds whereas the plants of the genus Erodium merely drop their seeds when the seed pods mature, The best examples of such seed-throwing plants are those specifically mentioned above as well as *Geranium caespitosum* (sometimes identified as *Geranium Californicum*), *Geranium erianthum*, and *Geranium strigosus*. The seed-throwing arms of these plants have superior xeric qualities in that they are much more rapid in the speed of their response to changes in relative humidity of the environment; that the hysteresis curve (curve of movement in adsorption or desorption) is substantially the same, as compared to considerable differences in the older art; and the elements used lie in the form of a uniplanar spiral rather than the helix form of the seeds of the various species of Erodium and closely allied types.

The seed pods of the plants specifically mentioned generally contain five seeds circumferentially arranged around the base of the pod and lie within divergent arms, or fingers, of an extension of the seed pod. The five arms grow together as a single conical extension of the seed pod, extending axially from the base which contains the seeds. When the seeds are fully matured, the pod dries; and when the pod has dried to the condition nature desires for seed scattering, the warp force of these extensions rips the pod open and each of the five extensions snaps to their dry condition and literally throw the seeds in divergent directions. When dry, these fingers, or what might better be called the "throwing arms" of the pods, assume a shape such as that shown in FIG. 1 and form a uni-planar spiral of between 450° and 540°, depending to a considerable extent on the dryness of the environment. Since the seed pod itself bridles the warping force, that is, limits its movement until the warp force (the pWI) of the throwing arm exceeds the bridling force of the pod, the arms literally snap to their spiral form and the seeds are thrown 15 or 20 feet when the warp force of the five arms exceeds the bridling force of the pod. These throwing arms of the seed pod are the xeric element of this invention. As indicated above, this "throwing arm" of the seed pod can be used for some purposes in its natural condition, since it, the seed-holding extension of the seed pod, assumes the spiral shape when thoroughly dry and becomes straight (but not limp) when saturated.

However, as also indicated above, the element in its natural state is not as accurate as when the rib, or spine, thereof is cleaned of the other material composing the arm, as the spine has a longer life, is less readily affected by heat and pressure, and has much greater accuracy, since the coating of the spine will gradually deteriorate and thus gradually change its response to xeric conditions. The preferred method of cleaning such spines of the throwing arm is by retting the pods subsequent to their natural scattering of the seeds by placing them in a water bath having a temperature preferably of the order of about 80° to 100° F. The seeds are allowed to ret, or soak, in this water for a period of approximately 3 weeks to permit bacteria to attack the woody fiber coating the beards on the arm in its natural state. After such retting, the woody fiber coating and beards on the arm are readily removed by slight pressure, as by pulling the arm between the fleshy parts of the fingers of an operator. After this stripping action, the rib, or spine, which is left is relatively straight because of its saturated condition, and the element is ready for incorporation in the desired instrument.

Figure 6:
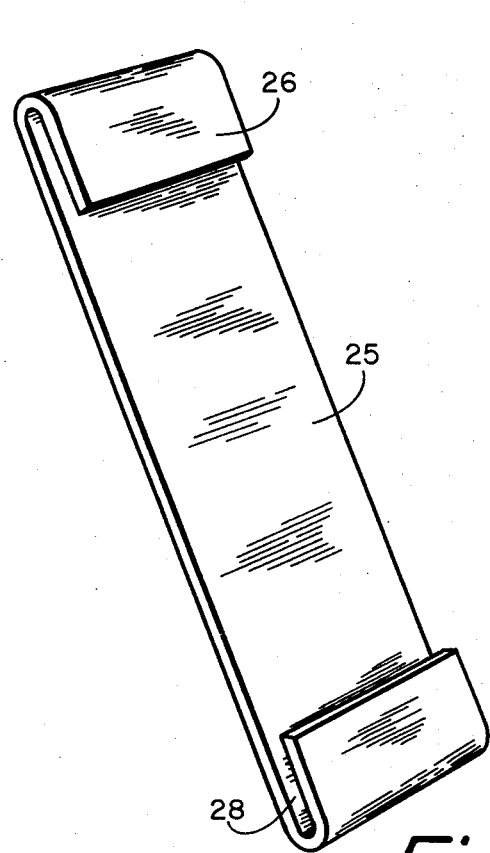
FIG. 6 is a greatly enlarged perspective view of a copper cradle, or "strip", in which one or more of the vegetable xeric elements are inserted.

Preferably, the spine, or a plurality of them, are soldered into a cradle formed by a thin strip of beryllium copper. Preferably, the copper strip has a thickness of one one-thousandths of an inch, a width of 2 millimeters, and a length of 14 millimeters — each end of the strip being folded back for a distance of 2 millimeters to form a "chip" 10 millimeters (1 centimeter) in length (FIG. 6). If two or three such spines, or ribs, in a thoroughly saturated and straight condition, are placed in the cradle, and each end dip soldered (FIG. 7), the elements are rigidly secured at their ends to the copper chip, and due to their saturated condition, the solder has not harmed them in any way. When dry, the chip will assume the form shown in FIG. 8 in which the natural warping force has been "bridled", or limited, to an angle of 60°.

The actual xeric element, i.e., the spine of the throwing arms of the seed pod of the genus Geranium, contains moisture, as do all organic fibers. Water in this fibrous arm is not all free water, but may exist in either the bound or partially bound state. Properties of bound water are considerably different from those of free water. Bound water vapor pressure is lower, and boiling temperature is higher; its freezing temperature is lower, and its density is greater than that of free water. Because the vapor pressure of bound water is less than that of free water, a dry xeric element will take up water until the vapor pressure of the absorbed water equals the pressure of the surrounding environment. As more water is taken up by the xeric element, the bonding energies become less. In a space saturated with water vapor, they ultimately become zero and vapor pressure of the adsorbed water equals the saturation pressure of water at the same temperature. Moisture in excess of this quantity is thermo-dynamically free water.

Warp in any xeric element is a function of bonding energies. At fiber saturation, the warp force exerted by the xeric element is zero, i.e., it is balanced by vapor pressure. As the vapor pressure of the surrounding environment is decreased, or the temperature increased, the bonding energy is increased and the xeric element generates a cellular stress proportional to the bonding stress. If the xeric element is unrestrained (commonly referred as being "unbridled"), the result in the throwing arms of the plants of the genus Geranium is a radial displacement in the form of a spiral. This action is most pronounced in the particular species above referred to. The warp force will reach equilibrium with the surrounding environment as the vapor pressure of the environment equals the vapor pressure of adsorbed water in the xeric element. In a completely dry environment at any given temperature and pressure, a state of equilibrium will be reached with the bound water. If the environment is maintained dry, and the pressure is reduced to zero, i.e., a vacuum, there will be a specific warp force index for any temperature. The values obtained by this procedure represent the upper limit of the warp force index (pWI). Thus, minimum and maximum warp force are defined by water immersion and the specific pWI (warp force index) for a given temperature. Warp displacement, i.e., the angle of displacement associated with a 1 percent change in relative vapor pressure, is greater at the high vapor pressure (high humidity) end of the displacement. It is almost linear between 30 percent and 80 percent relative humidity (R.H.). Below 30 percent R.H. the pWI is less than R.H., and above 80 percent R.H. the pWI is greater than R.H.

If the xeric element is completely bridled, i.e., restrained throughout its entire length, the warp force is manifested as a dynamic tension instead of a radial displacement. The dynamic tension as expressed by response of a silicon strain gauge, for example, is much more rapid than that of the same xeric element in the free-turning state. A significant behavioral aspect for measurement and control purposes is that a fully bridled element has a warp force that is linear over almost its entire range, specifically above 5 percent relative humidity and below 98 percent. However, a fully bridled element is more sensitive to temperature changes which will affect the metal to which the element is bonded because of the disparity in thermal coefficients of expansion between organic cellulose and inorganic metals. When the xeric element is partially bridled, i.e., attached to a resilient metal strip at its ends only, and in cups which permit linear compensation for differential thermal expansion, the warp force is as good as that of a completely bridled element, yet the xeric fiber (i.e., warp force) is not affected by thermal expansion or contraction of the metal, and throughout most of its length the fiber is free from cement or solder which would interfere with its reaction to the water content of its environment. It is for this reason that we prefer to use the xeric chips shown in FIGS. 7 and 8.

If the xeric element of the present invention is not abused, it has an indefinite life and will retain its warp force response indefinitely. If the element is subjected to a temperature in excess of 125° C. (approximately 250° F.), the pWI effect becomes irreversible, since water molecules are being driven off which were incorporated in the cellular structure by living processes. Warp displacement increases to the point at which incineration of the fiber occurs but it is irreversible after 125° C.

As indicated above, the xeric element of the present invention is what might be called the "throwing arm" 10 of the seed pod of the plants of the genus Geranium, and particularly of the species *Geranium maculatum*, *Geranium Richardsonii*, *Geranium attenuilobum*, *Geranium dissectum*, *Geranium caespitosum* (sometimes identified as "G. Californicum"), *Geranium strigosius* (sometimes identified as "G. nervosum"), *Geranium erianthum*, and *Geranium eriostemon*. The gynoecium of this genus generally contain five seeds which, during the development to maturity, are held in an individual pocket 11 formed between two diverging fingers 14 at the lower end of the "throwing arm", or seed-throwing member 10. The five respective throwing arms are attached to a central stylar column at the basal section directly above the ovule. The seed coat is connected to the stylar column with radial cellular structure. This structure "nails" the base of each individual throwing arm to the stylar column. The upper tips of the throwing arms, or xeric spines, are fastened solidly together and to the stylar column in the area directly below the stylodia, or free distal ends of the stylar column. Between these two points of attachment a longitudinal cellular structure analogous to "splitting" alignment exists between the xeric element segment of the seed coat and the stylar column. This fracture zone exists as a boundary layer between the dorsal aspect of the xeric element segment of the mature seed coat developed in the *Geranium gynoecium* and the stylar column. The cellular structure in this boundary layer does not possess xeric properties, i.e., it does not "warp". Thus, all five throwing arms are permanently attached to the tip of the central stylar column and are separably attached at their dorsal sides to that column. The significance of this mechanism is realized in the operation of the throwing arm on maturity of the fruit, i.e., at seed maturity. First the seed coat containing the mature seed is ruptured when the "wrist" area directly above the pocket holding the seed contracts and pulls the seed from its position in the receptacle. This action opens the pod so that the seed lies loosely in a capsule with the bottom open. Continued drying of the xeric element finally increases stress on the wrist section which is "nailed" to the stylar column and on reaching critical stress level, the "wrist" is released. The released stress results in cleaving the boundary layer between the xeric element and the stylar column as the xeric element curls. This action results in an underhand throwing action which casts the seed many yards. The resulting throwing action is the method used by plants of the Geranium genus for seed dispersal. Such a throwing action is the result of the warp force actuated by a molecular stress in the cellulose crystallite of the throwing arm. It is this throwing arm, warping in response to conditions of moisture and dryness, which we employ as the xeric element for the sensing of moisture.

Since the mechanism is in nature quite complex, the following analogy is used to explain the mechanism of the throwing arm: Visualize a baseball held in one's hand, and the hand and arm extending straight down along the leg; the ball held toward the leg. The wrist of the hand is strapped to the leg with a breakable elastic band. First the wrist is turned upward so the ball is held in a cupped hand, palm downward. Then increasing force is exerted against the elastic band until it breaks.

In its natural condition, each of the arms 10 is a vegetable element which naturally is extremely xeric in nature and very resistant to outside conditions other than moisture, such as gases, and nonhydrous liquids, such as oil, alcohol, and the like. This element is covered by a thin vegetable coating from which extend a great plurality of hairs, or barbs, which coating is subject to deterioration and preferably is removed by the retting process to be described shortly. As mentioned above, a warp force begins to develop in the throwing arms as the seed matures. Since they are attached to the stylar column, motion or movement of the arm is completely bridled until that time when the combined force of the arm overcomes the release force at the base, or "wrist". When the warp force exceeds that of the tension at the wrist, the boundary layer between a xeric element and the stylar column splits as if it had been struck with an axe and the arms 10 snap to their naturally dry position, which is shown in FIG. 1. This movement of the arms is so rapid and so strong that seeds are thrown up to distances of from 15 to 20 feet. This action can perhaps best be compared to snapping a pea or bean by a finger held in restraint by the thumb. After the seeds are thrown, the residual gynoecium consists of the receptacle (not shown) where the seeds matured, a central stylar column (likewise not shown) extending upwardly therefrom, and at the top of this column the several throwing arms 10 attached by their upper thread-like tips 12.

Figure 2:
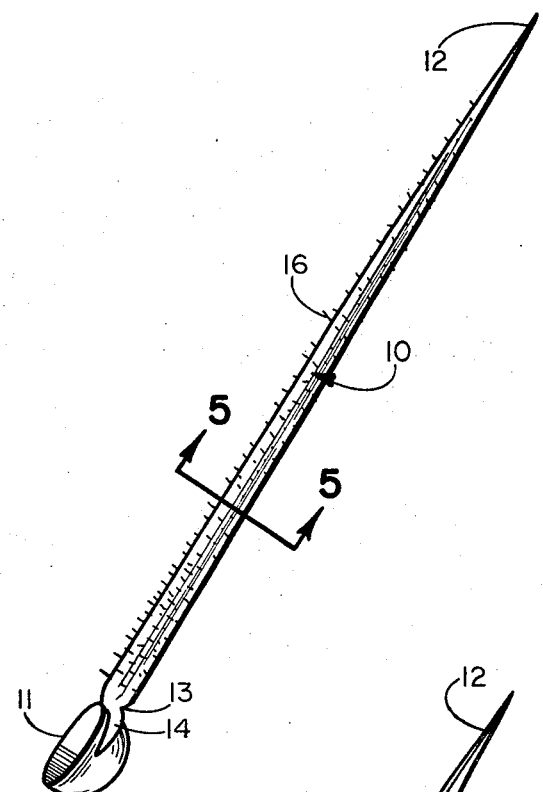
FIG. 2 is the arm of FIG. 1, shown in a fully saturated condition.

The seeds (not shown) develop in a small membrane, or pocket, 11 which is cradled between the divergently extending fingers 14 attached to, and integral with, the lower end of the arm 10. When examined under a microscope, it is seen that the fingers 14 are joined to the arm 10 by a wrist-like contraction 13 which is both exceedingly strong and has a greater warp force than the balance of the arm. FIG. 1 illustrates the natural throwing arm, or seed-throwing extension of the seed pod of the plant Geranium dissectum, when the arm is in its dry condition. However, all of the plants of the genus Geranium have the same shape, differing from that of *Geranium dissectum* only in size and strength. FIG. 2 shows the arm of FIG. 1 when it is in a fully saturated, and, therefore, straight condition. It perhaps should be mentioned here that when straight, these arms are not limp—they straighten with the same force that they bend to the spiral form when drying. Hence, these fibers assume the same shape on both adsorption and desorption. A wet xeric element is analagous to a splinter or straight spine.

The arms as they exist naturally, after the throwing of the seeds, can be used for very satisfactory xeric elements. They do respond to changes in relative humidity more rapidly than known xeric elements, their curves of adsorption and desorption are closer together than heretofore known, and they do have a relatively long life as compared to elements heretofore known. However, since the covering 15 (FIG. 5) of the spine, or rib, of the arms deteriorates more rapidly than the rib, such deterioration does affect the accuracy and response of the device in which they are contained. Accordingly, we prefer to form the xeric elements by retting in the following manner: gynoecium of a suitable type are collected after they have fully ripened and thrown their seeds. Preferably, the spiral throwing arms are removed from the gynoecium and are soaked in a warm water bath, preferably one having a temperature of between 80° and 100° F. The pod extensions, or arms, are allowed to ret, or soak, in the water for a period of approximately 3 weeks to permit bacteria to attack the thin fibrous coating 15 and beards, or barbs, 16 thereon. The inner rib has been found to be very resistant to bacterial action and will not rot away, as will the surface coating 15. It has been found that the action can be speeded up by increasing the temperature, but it appears that more consistent results are secured by slower retting in warm water.

Figure 3:
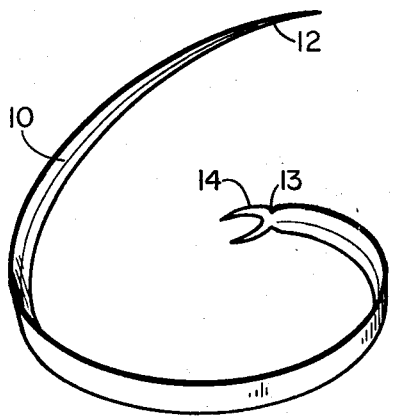
FIG. 3 is a view of the spine of the arm shown in FIGS. 1 and 2 after retting and stripping and in the dry condition.
Figure 4:
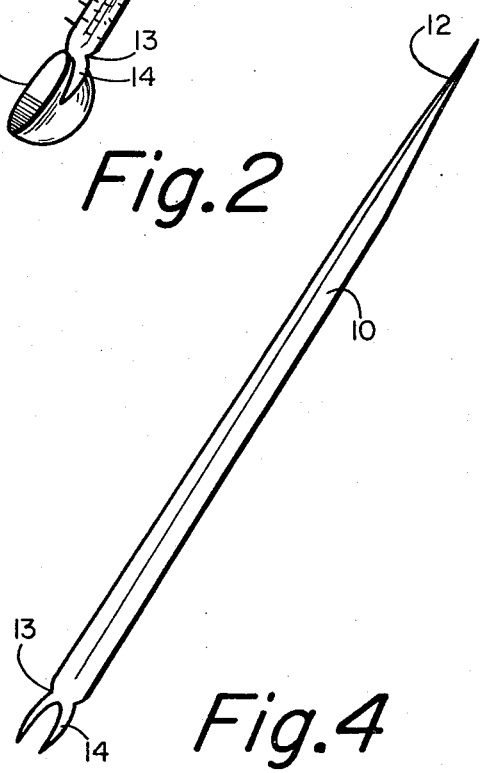
FIG. 4 is the retted, and stripped, member of FIG. 3 shown in its straight condition, which is assumes when it is thoroughly saturated.
Figure 5:
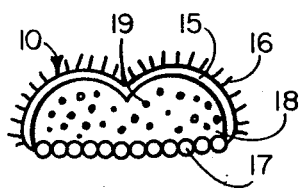
FIG. 5 is a cross-sectional view of the arm of FIGS. 1 and 2, such as taken along the plane indicated by the line 5—5 of FIG. 2.

After the seed pods, or specifically the throwing arms, have been allowed to ret for a sufficient period of time, the coating 15, beards 16, and pocket 11 are stripped from the rib, which is then in a relatively straight form because of its saturated condition. Stripping can be readily accomplished in a simple manner, such as by pulling the arms through the fleshy part of the tightly closed fingers of one hand of an operator. Usually, it is not desirable to use finger nails or other sharp surfaces to grasp the rib, as that may cut, and therefore weaken the final element. It is possible to determine when the pod extensions are ready for stripping by examining their color. When the pods are first placed in the water, they have a relatively light brown color, whereas, after the bacterial action, which results from the prolonged retting, they have a relatively dark brown color. Removing the covering from the rib of the extension of the seed pod exposes the inner fiber rib which has a relatively smooth hard-looking appearance, such as shown in FIG. 4. If this rib is allowed to dry, it assumes the form shown in FIG. 3 which, for all practical purposes, is identical with the shape of the natural dried throwing arms shown in FIG. 1. A cross-section of the throwing arm of Geranium dissectum is shown in FIG. 5 — it being shown with its natural covering as in FIGS. 1 and 2. It has a flat dorsal side formed of tightly packed, longitudinal fibers 17 which have elasticity in both wet and dry states but do not warp. The balance of the spine 10 is formed of cellulosic material 18 with longitudinal fibers 19, which warp as moisture conditions change. The warping phenomenon is associated with the physics of cellulose crystallite structure and the nature of fibrillar structure in the xeric cells. It will be understood by those skilled in the art that the retted fiber can be used as a xeric element in the form in which it appears in FIGS. 3 and 4. For example, if one end of the fibrous arm 10 were cemented to a fixed axis, and a light pointer were cemented to the free end of the element, a xerometer of satisfactory characteristics would be provided, as is shown in FIGS. 5 and 6 of the copending application of Fenner, one of the inventors herein, entitled "Xerometer", Ser. No. 834,093, filed June 17, 1969, now U.S. Pat. No. 3,608,377. The trouble in using the element in this way, and without further preparation, is that the dial of registration would have to have a dial extending through an angle of about 420° to perhaps 540°. Accordingly, it is preferable to use the partially bridled element, which will now be described.

Figure 7:
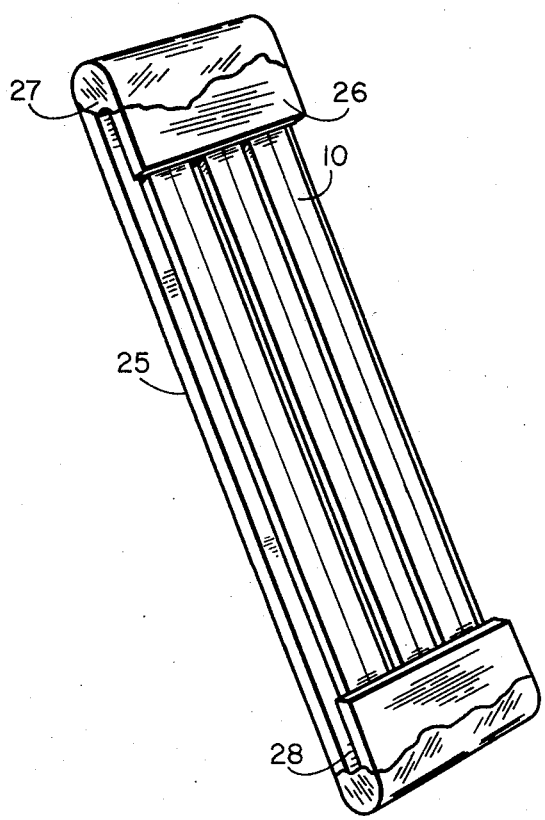
FIG. 7 is a perspective view of the completed device, or "chip", in which three of the vegetable elements, while completely saturated, have been soldered or otherwise retained.
Figure 8:
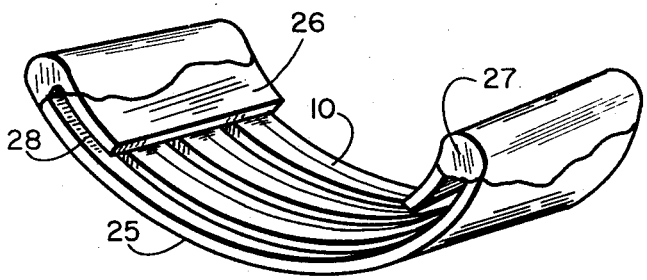
FIG. 8 shows the chip of FIG. 7 in the position which it assumes when the vegetable elements have been permitted to dry.

It has been found that, for most practical applications of the xeric element of the present invention to measuring and other devices, it is better to bridle the movement of the xeric element as by securing the ends of sections of the fiber to a bridling member, or saddle, such as one formed of a thin sheet of beryllium copper 25 (FIGS. 6 to 8, inclusive). Tests show that for practical purposes the bridled element, or "chip", of satisfactory characteristics, can be obtained by using a sheet of beryllium copper which has a thickness of one one-thousandths of an inch, a width of 2 millimeters, and a length of 14 millimeters. The ends 26 of this saddle 25 are bent backwardly along a common face of the saddle for a distance of 2 millimeters to form the pockets 28, shown particularly in FIG. 6. This saddle now accordingly has an overall dimension of 2 millimeters in width by 1 centimeter in length. The xeric elements of Geranium dissectum have a warp force of about 5 grams each, though other species exert forces greater than 100 grams. In order to provide a bridled element having movement through an angle of approximately 60°, and in order to equalize small variations in the strength of individual fibers, it is better to insert a plurality of fibers (usually three) having a length of about 9 to 10 millimeters into the bridling element 25. Since the wrist portion of the fiber is the strongest portion and has a stronger warp force, we prefer to use the 9 millimeter segment which includes the wrist 13 of the fiber at one end. These sections of xeric fiber are in a thoroughly saturated and therefore an exceedingly straight condition, and are inserted by means of tweezers into the pockets 28 formed between the major portion of the bridling element 25 and its reversed ends 26, with the dorsal side 17 against the saddle 25. Each end of the combination is then wrapped with fine wire and immediately dipped in melted solder while still wet, whereby the solder 27 solidifies within the pockets 28, thereby anchoring the fiber elements 10 at their ends to the saddle. This is shown particularly well in FIG. 7, in which the fiber elements 10 are in their fully saturated condition and the saddle, or bridling element 25 retains its naturally straight configuration. If this chip, or bridled element is permitted to dry, it has an arcuate shape in which the two pocketed ends form an angle of about 60° relative to each other, as shown in FIG. 8. The pockets permit movement which compensates for the differential coefficient of expansion between the xeric element and the metal.

Since the saddle and the fibrous element are united only at their ends, the bridling does not affect the natural warping actions of the fiber, but it does hold the fibers in the desired parallel position in which all elements work together. If the element is not abused, it has an indefinite life and will retain its warp force response indefinitely. The selectivity of this xeric element to moisture, its capacity to maintain equilibrium with moisture in almost any surrounding environment with a minimum hysteresis effect, its response at high and low temperatures, its ability to function under conditions of vacuum or up to 3,000 pounds per square inch environments, its strength, its resistance to contamination, its small size, its capacity to respond reliably at extremes of fully wet and fully dry conditions, are factors which make this element extremely useful. In addition, the device with which this xeric element can be associated, can be much simpler than those heretofore used in xeric measurements.

It will be understood by those skilled in the art that the plants of the genus Geranium and especially the species mentioned in the claims, are illustrative of a larger group of "seed-throwing" plants. Hence, the invention should not be deemed to be limited to this genus Geranium or to the particular species claimed, but to include any plant in which an extension of the seed pod, or husk, which, when dry, assumes a substantially uni-planar spiral curve. It is known that cellulose generally has warping characteristics, but not all such materials are usable in xeric instruments for various reasons. For purposes of instrumentation, it is essential that the xeric fiber have a reversible action, so that it moves through the same curve on both adsorption and desorption; that the response to changes in relative humidity be rapid; that the response to changes in relative humidity be constant over long periods and under all conditions (i.e., that it be accurate); and that it have sufficient inherent strength in both wet and dry conditions to not break when bridled. In addition, it is highly desirable that its curvature be substantially uni-planar, that its movement be in equal increments directly proportional to each change in moisture content over a long range; and that it have substantially identical hysteresis curves on adsorption and desorption. Other desirable characteristics are that it have a long life; that it have a low thermal coefficient so that it will be affected by moisture only and not by temperature; that it have good viscoelastic qualities so that it has elasticity even when bent to its limit of movement; and that it be of a shape and size to fit easily into small instruments. In all of these particulars, the plants of the genus Geranium, and particularly the species herein mentioned, specifically fulfill all of these requirements, but other plants which "throw" their seeds will have some of them and, accordingly, many of them could be used for inferior instrumentation.

Likewise, many modifications in the form of the saddle, or bridling, element can be suggested by those skilled in the art. Obviously, the bridled element may contain one or a considerable plurality of the vegetable xeric elements; the saddle can be longer so as to use substantially all, or at least a larger portion of the fiber, or smaller, to be incorporated directly into solid state circuitry; the fiber can be attached directly to piezoelectric strain gauges, such as the Endevco "Pixie", without the saddle; the fiber can be attached to the saddle by other means, such as an epoxy glue, or the element could be secured to the saddle throughout its entire length, such as by cementing to a flat sheet of beryllium copper by an epoxy glue, and the like. Accordingly, it is intended that the appended claims cover such modifications as fall within the true spirit and concept of the invention.

We claim:

1. A xeric element comprising the rib of the seed throwing arm of the seed pod of plants of the genus Geranium, said seed throwing arm in its natural state having said interior rib and an outer covering thereon, said outer covering being stripped away from said rib to expose the rib to the atmosphere by retting said arm and then stripping said covering from said arm.

2. The element of claim 1 in which the plant is *Geranium dissectum*.

3. The element of claim 1 in which the plant is *Geranium Richardsonii*.

4. The element of claim 1 in which the plant is *Geranium attenuilobum*.

5. The element of claim 1 in which the plant is *Geranium maculatum*.

6. The element of claim 1 in which the plant is *Geranium eriostemon*.

7. A xeric element of claim 1 wherein the throwing arm of the seed pod is taken from the class consisting of *Geranium attenuilobum*, *Geranium maculatum*, *Geranium eriostemon*, *Geranium Richardsonii*, and *Geranium dissectum*.

8. A xeric element comprising a saddle formed of a thin resilient metal, a moisture-sensitive fiber taken from the seed pod of a plant of the genus Geranium, and means for securing the ends of the fiber to the metallic saddle with the length of the fiber lying along the metal saddle.

9. A xeric element of claim 8 wherein the moisture-sensitive fiber is taken from the spine of the seed-throwing arm of the seed pod of the group of plants consisting of *Geranium dissectum*, *Geranium Richardsonii*, *Geranium attenuilobum*, *Geranium maculatum*, and *Geranium eriostemon*.

10. The device of claim 8 in which a plurality of the moisture-sensitive fibers are secured to the metal saddle.

11. The xeric element of claim 11 in which the metallic element comprises a sheet of beryllium copper with a thickness of approximately one one-thousandths of an inch.

12. The method of preparing a xeric element which comprises forming a saddle out of a thin sheet of resilient metal, bending over the ends of said sheet to form pockets at the two ends thereof, placing on the metal sheet and extending into each pocket thereof a plurality of the fibrous ribs secured from retting the throwing arms of the seed pods of a plant of the genus Geranium, said arms being characterized by a soft fibrous coating enclosing a relatively firm rib, said retting being for a sufficient time to allow bacteria to attack the soft fibrous coating of the arm and then stripping the soft material from the relatively firm rib within the arm, and soldering each end of the metal sheet to secure the ends of the firm hard ribs within the pockets formed in the ends of the metal element.

13. The method of claim 12 wherein said plant is taken from the group consisting of *Geranium dissectum*, *Geranium Richardsonii*, *Geranium attenuilobum*, *Geranium maculatum* and *Geranium eriostemon*.

14. A xeric element comprising the spine only of the seed-throwing arm of the seed pod of plants of the genus Geranium, comprising also a metallic saddling element and means for securing the xeric element thereto with the length of the fiber lying along the metal saddle.

* * * * *